No. 675,333. Patented May 28, 1901.
A. L. JOSLYN.
SAW.
(Application filed Dec. 29, 1900.)
(No Model.)

Witnesses
W. S. Morrison.
W. E. Van Wert.

Inventor
Arthur L. Joslyn
By Ward & Cameron
Attys.

THE NORRIS PETERS CO., PHOTO-LITHO., WASHINGTON, D. C.

UNITED STATES PATENT OFFICE.

ARTHUR L. JOSLYN, OF ALBANY, NEW YORK.

SAW.

SPECIFICATION forming part of Letters Patent No. 675,333, dated May 28, 1901.

Application filed December 29, 1900. Serial No. 41,466. (No model.)

*To all whom it may concern:*

Be it known that I, ARTHUR L. JOSLYN, a citizen of the United States of America, and a resident of the city of Albany, county of Albany, State of New York, have invented certain new and useful Improvements in Saws, of which the following is a specification.

My invention relates to saws, and more especially to meat-saws; and the objects of my invention are to provide a saw so constructed that the blade may be readily taken out from the frame and another blade put in and held securely in the frame, so that several blades may be used with one frame in order that when one blade becomes dull it may be quickly removed and a sharp blade inserted in its place. I obtain these objects by means of the mechanism illustrated in the accompanying drawings, in which—

Figure 1:
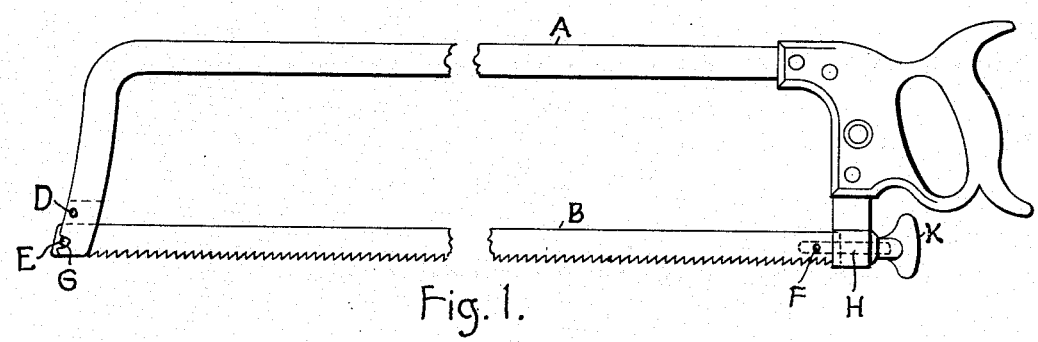
Figure 2:
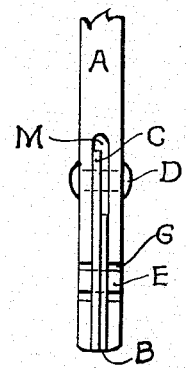
Figure 3:
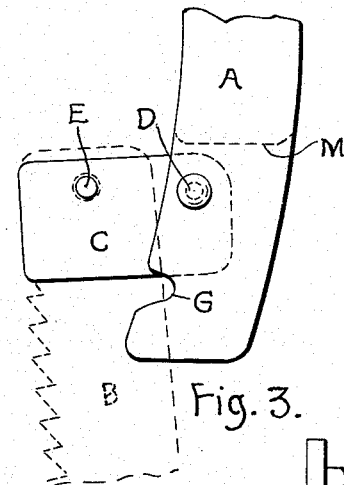
Figure 4:
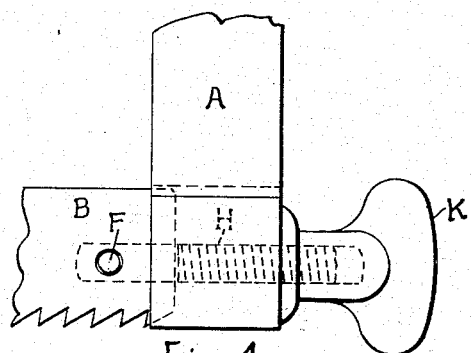
Figure 5:
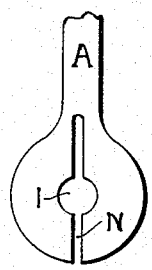
Figure 6:
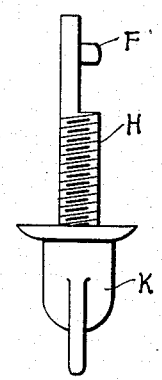

Figure 1 is a side elevation of a saw, showing the blade attached to the frame by means of my invention. Fig. 2 is an end elevation of the forward end of the saw-frame with the end of the blade attached thereto. Fig. 3 is a side elevation of the forward end of the frame, showing the means of attaching the blade. Fig. 4 is a side elevation of the end of the frame near the handle, showing the method of attaching the saw at that end. Fig. 5 is an end elevation of the end of the frame near the handle, showing the slot for the end of the saw and the opening for the threaded bolt which holds the saw. Fig. 6 is a detail view of the threaded bolt with the thumb-nut, which holds the saw at the end of the frame next the handle.

Similar letters refer to similar parts throughout the several views.

A is the frame of a saw.

B is the blade. The blade is provided with a hole in each end suitable to fit upon the pins E and F.

The forward end of the frame, farthest from the handle, is provided with a slot M, as shown in Fig. 2, and in this slot is a small plate C, attached permanently to the frame by means of the rivet D, upon which as a pivot the plate C can move easily, as shown in Figs. 2 and 3. Attached to the plate C is a pin E, extending on each side of the plate C outwardly enough to come flush with the sides of the frame A when in position, as shown in Figs. 1 and 2.

The slot M in the end of the frame A is broad enough so that the plate C and the blade B may both be contained side by side therein. The forward end of the frame is also provided with a notch G suitable for the pin E to fit in, as shown in Figs. 1 and 3, so that when the hole in the end of the blade is placed upon the pin E the plate C, with the end of the blade B, may be moved in position in the slot M, as shown in Figs. 1 and 2.

The blade is attached to the end of the frame near the handle by means of the threaded bolt H, which extends through the opening I of the frame, and the end of the blade attached thereto by the hole in the blade being placed upon the pin F. The said pin F is attached to or forms a part of the threaded bolt H, which extends through the handle and upon which is fitted the thumb-nut K. The thumb-nut K bears against the end of the frame, so that by turning the thumb-nut K it brings the bolt H outwardly toward the handle, and this in turn, by means of the pin F being in the hole at the end of the blade, draws the end of the blade within the slot N at that end of the frame, and thus draws the blade tight.

The operation of placing the blade in the frame by means of my invention is as follows: The plate C is swung outwardly from the frame A, as shown in Fig. 3, and when in this position one end of the blade is placed upon the pin E. The plate C, containing the blade, is then swung downwardly and into the slot M in the frame A, so that the ends of the pin E will fit into notches G. Then the blade is swung into position, and the other end of the blade is attached to the pin F by inserting the pin F through the hole in that end of the blade. Then the thumb-piece K upon the bolt H is turned, drawing the bolt H in that direction and drawing the end of the blade into the slot N in that end of the frame, and thus drawing the blade taut, as may be desired. Used in this way the blade is quickly attached and detached from the frame and held securely and taut while being used and readily removed for the insertion of another blade. Also this is a simple means of fastening the blade in the frame, and the frames made with my attachments can be made with little expense and are not liable to get out of order.

What I claim as my invention, and desire to secure by Letters Patent, is—

A saw, the blade of which is provided with a hole near each end and is connected to the frame at the forward end, farthest from the handle, in a slot or recess in said frame, by means of a plate, one end of which is held in said slot by a suitable rivet or pin about which it may turn, as on a pivot, the other end of said plate being provided with a pin or projections extending outwardly slightly on each side and adapted to fit in corresponding notches in the outer end of the frame, said plate adapted to swing outwardly from said slot upon said pivot and to receive the hole in one end of the blade upon one of said projections and to swing into said slot with the end of said blade, the other end of said frame next the handle also provided with a slot suitable to receive the other end of said blade, and also provided with a threaded bolt with a thumb-nut on one end and a pin or projection on the other end, adapted to engage the hole in that end of the blade, substantially as described and for the purposes set forth.

Signed at Albany, New York, this 26th day of December, 1900.

ARTHUR L. JOSLYN.

Witnesses:
 WALTER E. WARD,
 W. EVERITT VAN WERT.